(12) United States Patent
Gold

(10) Patent No.: US 6,772,305 B2
(45) Date of Patent: Aug. 3, 2004

(54) DATA READING AND PROTECTION

(75) Inventor: Stephen Gold, Fort Collins, CO (US)

(73) Assignee: Hewlett Packard Development Company LP, Houston, TX (US)

( * ) Notice: Subject to any disclaimer, the term of this patent is extended or adjusted under 35 U.S.C. 154(b) by 187 days.

(21) Appl. No.: 10/060,032

(22) Filed: Jan. 31, 2002

(65) Prior Publication Data

US 2002/0116573 A1 Aug. 22, 2002

(30) Foreign Application Priority Data

Jan. 31, 2001 (EP) .......................................... 01300825

(51) Int. Cl.[7] .............................................. G06F 12/16
(52) U.S. Cl. ..................................... 711/162; 707/204
(58) Field of Search ........................... 711/162; 707/204

(56) References Cited

U.S. PATENT DOCUMENTS

| | | | |
|---|---|---|---|
| 5,535,381 A | * | 7/1996 | Kopper ........................ 710/52 |
| 5,570,332 A | * | 10/1996 | Heath et al. ............... 369/30.1 |
| 5,596,736 A | | 1/1997 | Kerns |
| 5,612,733 A | | 3/1997 | Flohr |
| 5,644,786 A | | 7/1997 | Gallagher et al. |
| 5,664,143 A | | 9/1997 | Olbrich |
| 5,854,941 A | * | 12/1998 | Ballard et al. ................. 710/5 |
| 5,943,603 A | | 8/1999 | Parulski et al. |
| 6,035,351 A | * | 3/2000 | Billings et al. ............... 710/74 |
| 6,170,042 B1 | * | 1/2001 | Gaertner et al. ............ 711/158 |
| 6,272,565 B1 | * | 8/2001 | Lamberts ..................... 710/43 |
| 6,311,256 B2 | * | 10/2001 | Halligan et al. ............ 711/158 |
| 6,385,624 B1 | * | 5/2002 | Shinkai ...................... 707/201 |
| 6,606,651 B1 | * | 8/2003 | Linde ......................... 709/216 |
| 2002/0087823 A1 | * | 7/2002 | Chow et al. ................ 711/170 |

FOREIGN PATENT DOCUMENTS

| | | |
|---|---|---|
| EP | 0 410 630 A2 | 1/1991 |
| EP | 0 767 431 A1 | 4/1997 |
| WO | WO 99/15953 | 4/1999 |

* cited by examiner

Primary Examiner—Hiep T. Nguyen

(57) ABSTRACT

A method of reading data from a primary storage medium uses a reader moveable relative to the primary storage medium. The method includes sorting a list of files into an order which reduces the movement of the reader relative to the primary storage medium for the reading of the files and reading the files from the primary storage medium in that order.

52 Claims, 4 Drawing Sheets

DATA READING AND PROTECTION

BACKGROUND OF THE INVENTION

The invention relates to data reading and data protection. In particular, the invention relates to backing up data for protection against loss.

Currently there are two basic methods of reading data from a storage disk for supply to secondary storage devices (e.g. tape drives). The first method is the "file-by-file" method which comprises proceeding sequentially through the file directory for the disk and reading each file from the disk one by one in the order in which they are specified in the directory structure. The second method is the "image" method which comprises reading the whole of the disk sequentially from its first sector, and then using the file system data to work out the locations of the files on the resulting back-up tape.

The file-by-file method can be very slow when files are randomly stored across the disk, since the disk drive has to mechanically move its read head from one area to another for each file and, if the files are small, then performance is limited by the random access speed of the disk drive. It is relatively quick to restore a disk from a file-by-file back-up since the files are a single contiguous area in the tape or other kind of secondary storage device.

The creation of an image back-up is always very fast as it involves reading large sequential blocks from the disk with little repositioning of the read head being required, so that performance is limited by the sequential speed of the disk which is usually higher than the performance of the tape drive or other secondary storage device used. However, with image back-up, there are problems associated with restoring the backed-up data to the disk, as the files may not be in a single contiguous area on the tape if they were not contiguous on the disk.

The file by file method is slow to back-up a disk and quick to restore it, whereas the image method is quick to back-up a disk but slow to restore it.

EP-A-0 767431 discloses a system for backing-up computer disk volumes by performing an image back-up of a primary storage medium and additionally creating a file index that is also stored on the secondary storage medium, in this case tape. The file index provides the portion of individual files on the secondary storage medium that allows files to be restored to be accessed from the secondary storage medium in as contiguous manner as possible. However, the performance of the restore is still less than a conventional file-by-file restore because the relatively slow secondary storage medium must be accessed to read the file index before a restore may actually be performed.

SUMMARY OF THE INVENTION

An aim of the invention is to provide enhanced data reading and/or data back-up.

According to one aspect, the invention provides a method of reading data from a storage medium using a reader moveable relative to the medium, the method comprising sorting a list of files into an order which reduces the movement of the reader relative to the medium for the reading of said files and reading the files from the medium in said order.

According to another aspect, the invention provides apparatus for reading data from a primary storage medium, comprising a reader moveable relative to the primary storage medium for reading the files from the primary storage medium and a sorter for sorting files to be read into an order which reduces the movement of the reader relative to the primary storage medium.

In one embodiment, the primary storage medium which is read is a disk, particularly a magnetic hard disk. Alternatively, the storage medium is, for example, a tape.

By sorting the list of files to be read from the primary storage medium in this way, the speed of the back-up can be much greater than the aforementioned file-by-file method since the files can be read from the storage medium without wasting time seeking the files in the storage medium. For example, in the case where the storage medium is a magnetic hard disk, the reading can be done with relatively few read head realignment operations. Although the reading process has a speed approaching that of the image method, it has the advantage that the files can be written into back-up storage with greater contiguity, and the position of each file in the back-up storage is known from the order into which the list was sorted for reading purposes. This is particularly advantageous as no index of files is required to be additionally stored on the back up, or secondary storage, medium to allow the position of the files to be determined. There is therefore no loss in performance in terms of restoring files as there would be if it was necessary to first search a file index before accessing the secondary storage medium.

In a preferred embodiment, the invention arrives at said order by sorting the files to be read into an order in accordance with their distance from an end location of the primary storage medium. This means that the files are read in the order in which they are to be found in the primary storage medium, thus reducing the need to reposition the reader relative to the medium.

Preferably, if a file to be read from the primary storage medium is fragmented, the file's position in said order is determined by the position in the medium of the fragment representing the beginning of said file. This helps to optimise the speed of reading the list of files since, if the position of a fragmented file in the sorted order was represented by some other fragment, then upon reaching the fragmented file in the sorted list, the read operation would immediately have to skip from the fragment represented in the order to the fragment representing the beginning of the file, thus incurring a delay.

In one embodiment, it is determined whether the number of fragmented files in the primary storage medium exceeds a threshold. If the threshold is exceeded, then defragmentation of the files is attempted prior to reading them. Advantageously, this improves the speed of reading the files from the primary storage medium.

The invention can be used in the backing-up of data for data protection purposes, wherein the data, after having been read in the manner described above, is then written to back-up, or "secondary", storage. Preferably, the back-up storage is a tape drive.

Alternative terminology for primary and secondary storage medium is respectively online and offline storage.

The invention extends to a storage area network (SAN) including apparatus according to the invention for reading data from a storage medium. The invention also extends to apparatus according to the invention for reading data from a storage medium wherein the reading process is initiated by a Network Data Management Protocol (NDMP) format request.

BRIEF DESCRIPTION OF THE DRAWINGS

By way of example only, the invention will now be described with reference to the accompanying Figures in which.

DETAILED DESCRIPTION OF PREFERRED EMBODIMENTS

Figure 1:
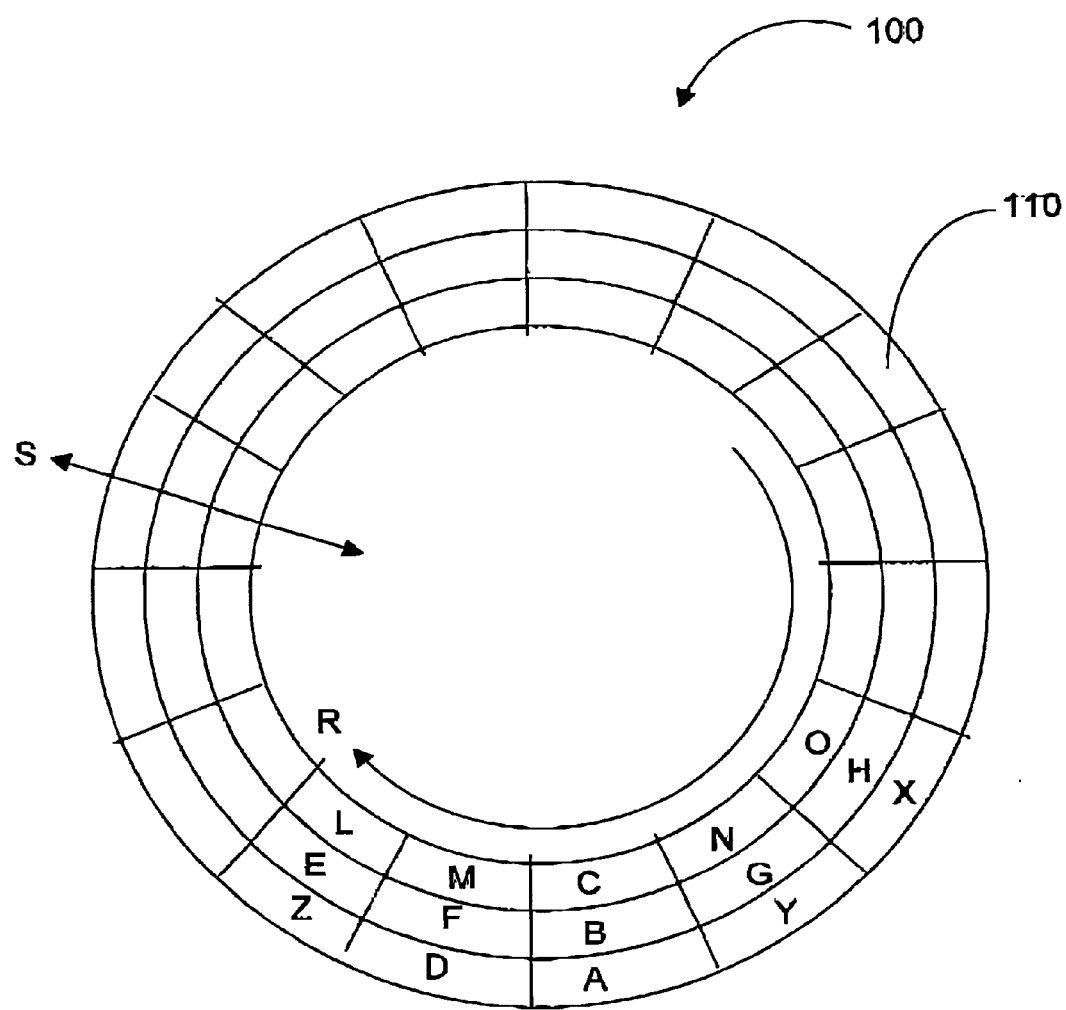
FIG. 1 illustrates some files on a hard disk.

The surface of hard disk 100 of FIG. 1 is divided into a series of concentric annular tracks, only the three outermost of which are shown. Each of the tracks is divided into a number of sectors, e.g. 110. For clarity's sake, we will assume that each of the sectors contains a separate file. According to the directory structure for the hard disk 100, the first four files on the disk are, in order, A, B, C and D. FIG. 1 shows the physical positions of files A, B, C and D on disk 100. To read a file from the disk 100, the read head of the disk drive containing disk 100 must be scanned over the sector containing the relevant file. The read head of the disk drive is capable of being moved radially with respect to disk 100 (as indicated by arrow S) in order to bring the read head into alignment with the track containing to the file to be read. The disk 100 rotates (in the direction indicated by arrow R) in order to scan the disk beneath the read head.

In the simplest type of back-up operation, all of the files are read from the disk so that they can be written to a tape drive (or other back-up storage device). Consider the case where the files are read from the disk 100 in the order in which they are listed in the directory, i.e. beginning alphabetically with file A.

Initially, the read head is positioned to the outermost track and the disk is rotated until file A has been found and scanned. Next, the read head is moved radially inward one track and then there is further delay of almost one complete revolution of disk 100 until file B passes beneath the read head and is scanned. Next, the read head is moved in one track and there is a further delay of almost a complete revolution of disk 100 before file C is scanned. Next, the read head is moved to the outermost track of disk 100. Then, there is a delay of almost an entire revolution of disk 100 before file D is scanned. It will be appreciated that during this reading procedure, there are significant delays incurred by repositioning the read head to the various tracks of disk 100 and also delays due to waiting for the relevant portion of the disk to revolve beneath the read head after the latter has been positioned to the correct track. The invention can significantly reduce the occurrence of such read delays.

Figure 2:
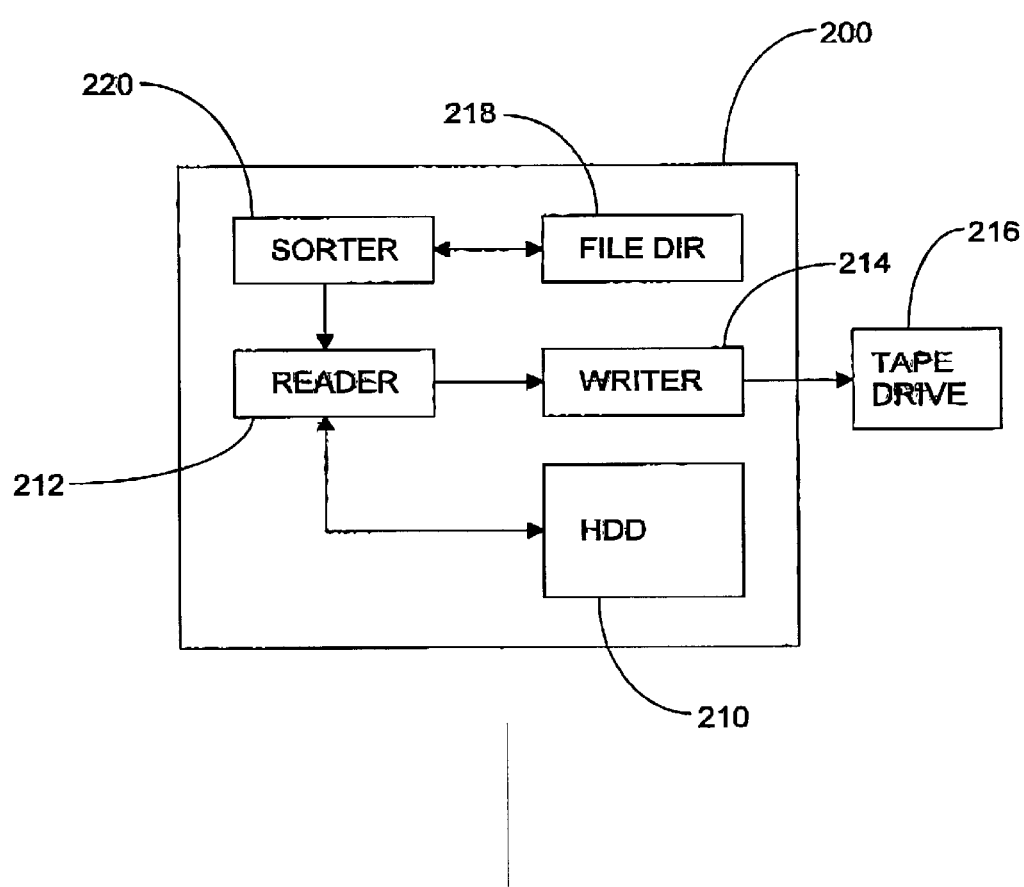
FIG. 2 is a block diagram of a computer system.

The computer system 200 of FIG. 2 contains a hard drive 210 containing the disk 100 of FIG. 1. The computer system 200 has a reader 212 for reading information from the hard disk 210 and a writer 214 for writing information retrieved by reader 212 onto a tape drive 216 for back-up purposes. The computer system 200 contains a file directory 218 which lists the files contained in hard drive 210.

The computer system 200 also contains a sorter 220. When the computer system 200 is instructed to back-up the files contained on the disk of hard disk drive 210 to tape drive 216, the sorter 220 obtains from the file directory 218 the list of files stored on disk 100 of the hard drive 210. The sorter 220 reorders the received list of files into the order in which the files are physically located on the disk 100. That is, the sorter ranks the files according to their distance from the beginning (i.e. the first sector) of the disk. The sorter 220 passes the reordered list to reader 212 which retrieves the files from hard drive 210 in the order specified by the reordered list. The retrieved files are then passed to writer 214 which records them on tape drive 216.

The reordered file list provided by sorter 220 gives the files in the order in which they are to be found on the disk 100. The sequence of the sectors on disk 100 begins with a nominated sector on the outermost track and proceeds anti-clockwise around the entire track. The sequence continues with the next track in and proceeds around that track in an anti-clockwise manner similar to that for the first track. The sequence continues from track to track in this way until the final sector is reached on the innermost track.

If one assumes that the sector containing file Y is the first sector on the disk then, proceeding around the outermost track in anti-clockwise direction, the following file is X which is in the adjacent sector in the anti-clockwise direction. The read sequence proceeds around the track concluding with the last three sectors containing files Z, D and A respectively. The read head is then stepped inwardly one track and the new track is read in the same manner as the outermost track. Reading continues at the sector containing file G and proceeds anti-clockwise to the sector containing H and so on around the track until the reading of the track is completed with the reading of the three sectors containing files E, F and B respectively. The read head is then stepped inwardly one track and reading begins again at the sector containing file N and then proceeds in the anti-clockwise direction to read the file O and so on around the track in the anti-clockwise direction concluding with the reading of the sectors containing files L, M and C respectively.

This completes the reading of the three tracks shown; in practice, the disk will contain many more tracks and the reading will continue track by track until all of the tracks have been read. In this example, the delays due to repositioning the head in the radial sense have been minimised and the delays due to rotating the disk in the direction R to find the relevant file have been eliminated, since every sector contains a file. In a real situation, there will, of course, be empty regions between files on a track (e.g. due to the deletion of files). However, modern file systems attempt to fit files into vacancies that appear on the disk which means that the empty regions will be small, of the order of 100 KB. Modern disk drives usually have read-ahead cache of 2 to 4 MB in size, with the result that empty regions between files will normally be read into the read-ahead cache at the same time as the valid data preceding the empty region is read. Thus, an empty region can effectively be skipped over when the next piece of valid data is read from the disk.

It will be appreciated that, due to the action of sorter 210, the files are not read from the disk in alphabetical order but in order of their physical locations on the disk, i.e. Y, X . . . , Z, D, A, G, H . . . , E, F, B, N, O . . . , L, M, C . . . The order in which the files have been retrieved and written to the back-up storage is logged in order to facilitate swift recovery of files from the tape unit 216. The reduction of the delays in the reading of data from disk 100 means that the tape drive 216 receives the back-up data at a rate high enough to prevent the tape drive 216 from pausing during writing of data to the tape. If tape drive 216 pauses, then it will switch off until the data steam resumes. By reducing the delays in reading data from the disk, the likelihood of the tape drive 216 switching off during back-up is reduced. This helps to shorten the back-up procedure since, if the tape drive 216 turns off then there is a significant delay whilst it starts up following a pause in the datastream from writer 214.

It is possible for disk 100 to contain fragmented files, i.e. files split between two or more sectors of the disk. Upon encountering a fragmented file, the sorter 100 includes the fragmented file in its reordered list by reference to the fragment containing the beginning of the fragmented file. This means that head repositioning required to locate the fragments of a fragmented file is reduced.

Figure 3:
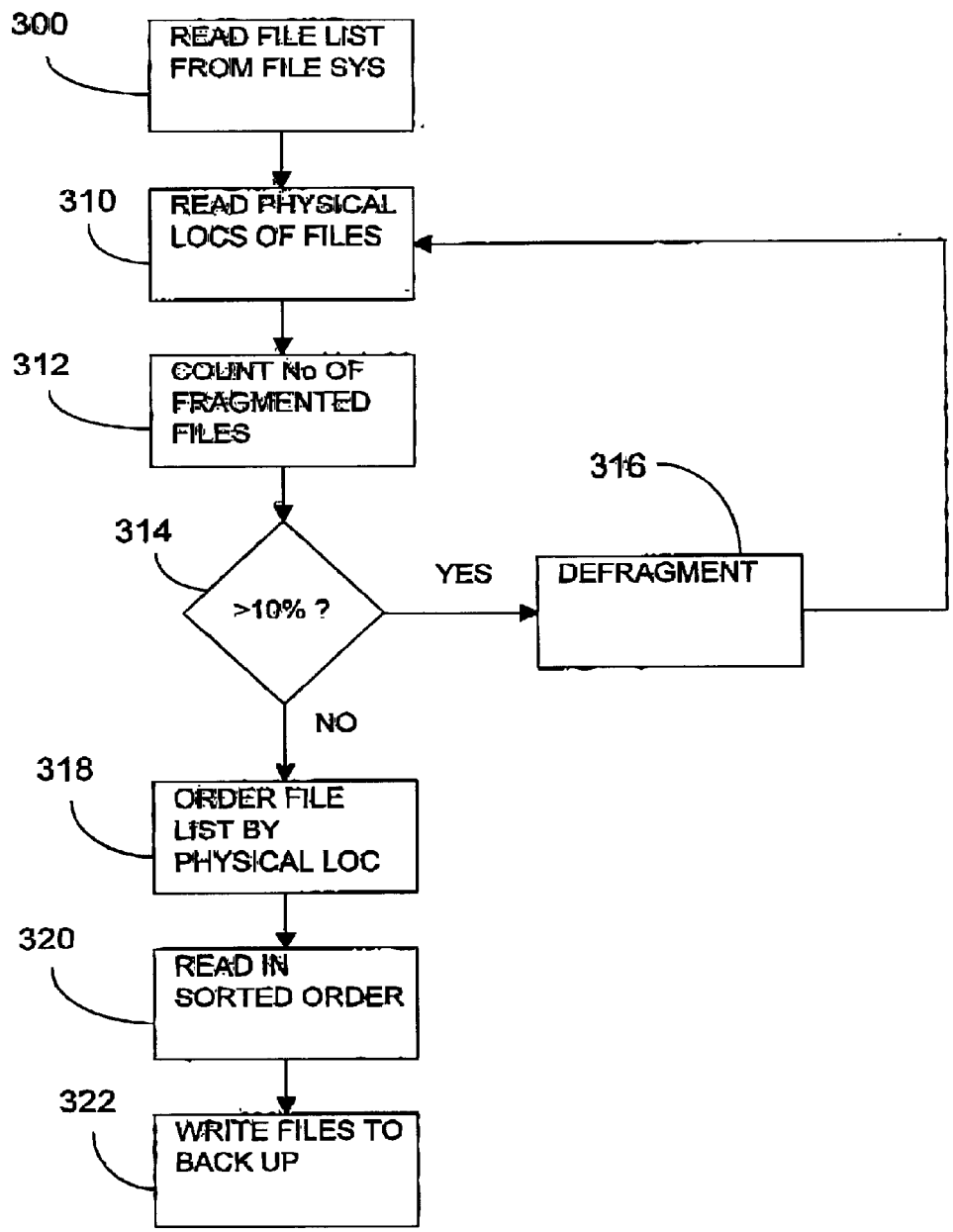
FIG. 3 is a flow chart describing a back-up process.

If a disk contains many fragmented files, then it may be efficient to defragment the files on the disk prior to sorting them by order of their physical locations. This step is included in the flow chart of FIG. 3, which illustrates a back-up procedure according to an embodiment of the invention.

At step 300, the sorter 220 reads the list of files on the hard disk drive from the file directory 218. At step 310 the sorter 220 determines the physical locations of the files on the disk, At step 312, the sorter counts the number of fragmented files on the disk. At step 314, the sorter determines whether more than 10% of the files on the disk are fragmented. If more than 10% of the files are fragmented, the sorter runs a defragmentation process at step 316 and then returns to step 310 to determine the physical positions of the files on the disk subsequent to the defragmentation operation. If at step 314 it is determined that less than 10% of the files on the disk are fragmented, the process moves to step 318, where the sorter 220 reorders the files for retrieval in order of the sequence in which they are physically located on the disk. At step 320, the files are read from the disk in the sorted order and, at step 322, the retrieved files are written to the tape drive 216.

The files on the disk can be tagged to indicate which files on the disk 100 have changed since the last back-up to tape drive 216. This provides the enhancement that only those files that have changed are then backed-up, thus reducing the time taken in the back-up process. Such an incremental back-up process cannot be done in a conventional image back-up arrangement.

Figure 4:
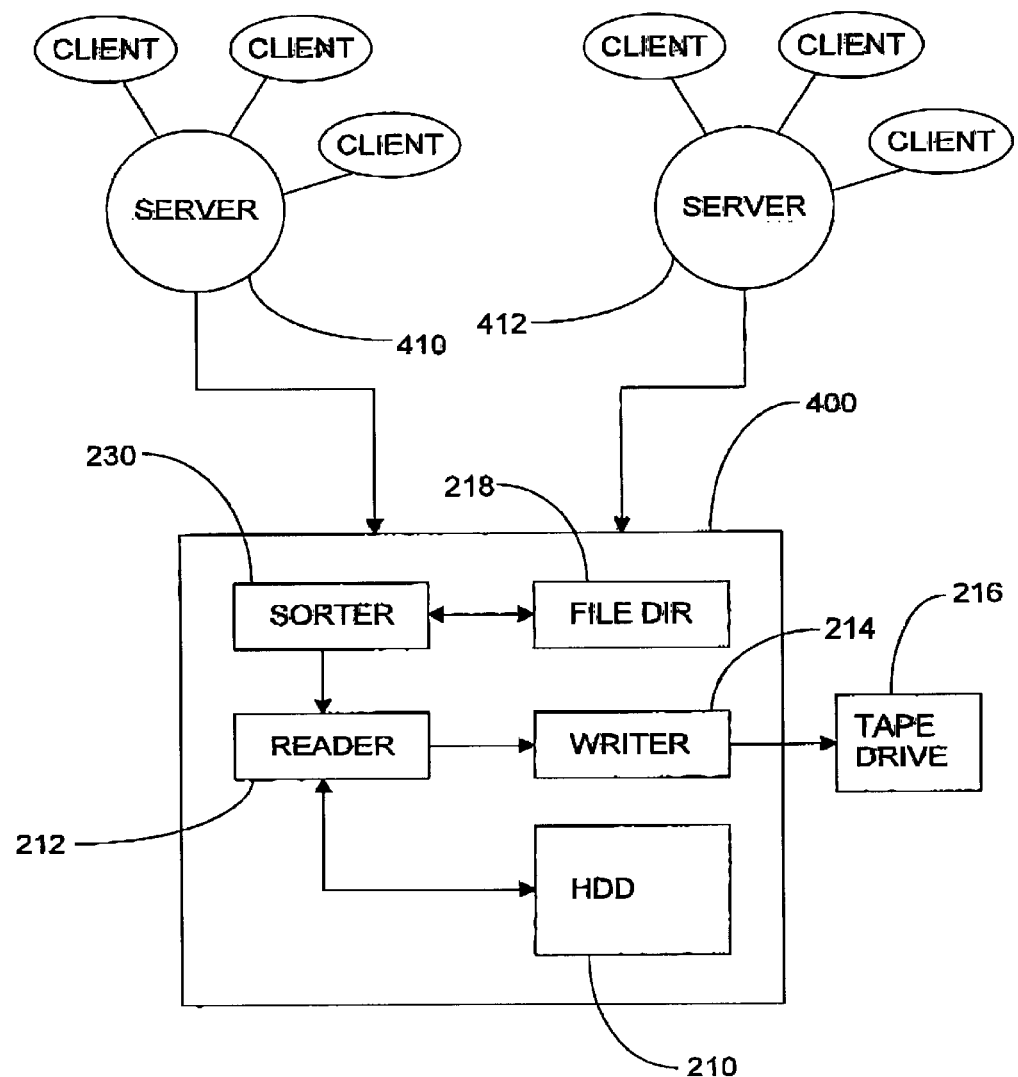
FIG. 4 illustrates a storage area network (SAN).

FIG. 4 illustrates the application of the invention to a storage area network, SAN 400. The storage requirements of the servers 410 and 412 are met by SAN 400, whose storage capacity is betokened by hard disk drive 210. In FIG. 4, components carried over from FIG. 2 retain the same reference numerals and serve the same purposes. The operation of the back-up system of FIG. 4 is therefore to be understood by reference to the description of the FIG. 2 system, provided above.

The invention is also compatible with the network data management protocol (NDMP). That is to say, the back-up process can be triggered by an NDMP command originating externally of the computer system 200 (or SAN 400) which causes the backing up of the files from the hard disk drive 210 to the tape drive 216 or to some other secondary storage device specified in the triggering command. The system may also report to the originator of the triggering command with the sequence of the files read from the hard disk drive 210.

What is claimed is:

1. A method of reading data from a primary storage medium using a reader moveable relative to the primary storage medium, the method comprising sorting a list of files into an order which reduces the movement of the reader relative to the primary storage medium for the reading of said files, reading the files from the primary storage medium in said order, and defragmenting the files that are fragmented and have been read from the primary storage medium.

2. A method according to claim 1, wherein said order lists the files according to their position relative to an end location of the primary storage medium.

3. A method according to claim 1, further comprising excluding from the order files that have not changed since a previous back-up event.

4. A method according to claim 1, wherein the primary storage medium is a data disk.

5. A method according to claim 4 wherein the disk is rotating and the files are stored on the disk in sectors at different radii, further including moving the reader radially as the disk is rotating, sequentially reading the sectors at the same first radius, then sequentially reading the sectors at a second radius next to the sectors at the first radius after the sectors at the first radius have been read.

6. A method of reading data from a primary storage medium using a reader moveable relative to the primary storage medium, the method comprising sorting a list of files into an order which reduces the movement of the reader relative to the primary storage medium for the reading of said files, reading the files from the primary storage medium in said order and, if a file is fragmented, determining the position of the fragmented file in said order on the list on the basis of the fragment representing the beginning of the file.

7. A method of reading data from a primary storage medium using a reader moveable relative to the primary storage medium, the method comprising sorting a list of files into an order which reduces the movement of the reader relative to the primary storage medium for the reading of said files, reading the files from the primary storage medium in said order, and defragmenting files before sorting them into said order if the number of fragmented files exceeds a threshold.

8. A method of reading data from a primary storage medium using a reader moveable relative to the storage medium, the method comprising sorting a list of files into an order which reduces the movement of the reader relative to the primary storage medium for the reading of said files, defragmenting the files before sorting them into said order if the number of fragmented files exceeds a threshold and reading the files from the primary storage medium in said order.

9. A method of reading data from a primary storage medium using a reader moveable relative to the primary storage medium, the method comprising sorting a list of files into an order which reduces the movement of the reader relative to the primary storage medium for the reading of said files, excluding from the order files that have not changed since a previous back-up event, reading the files from the primary storage medium in said order, and defragmenting the files that are fragmented and have been read from the primary storage medium.

10. The method according to claim 7 further including determining the position of the fragmented file in said order on the list on the basis of the fragment representing the beginning of the file.

11. The method according to claim 7 wherein the defragmented files are defragmented before sorting them into said order if the number of fragmented files exceeds a threshold.

12. A method of backing up data from a primary storage medium, comprising reading files from the primary storage medium using a reader moveable relative to the primary storage medium, sorting a list of files into an order which reduces the movement of the reader relative to the primary storage medium for the reading of said files, reading the files from the storage medium in said order, writing the files into secondary, back-up, storage, and defragmenting the files that are fragmented and have been read from the primary storage medium.

13. The method according to claim 12 further including determining the position of the fragmented file in said order on the list on the basis of the fragment representing the beginning of the file.

14. The method according to claim 12 wherein the defragmented files are defragmented before sorting them into said order if the proportion of fragmented files exceeds a threshold.

15. Apparatus for reading data from a primary storage medium, comprising a reader moveable relative to the primary storage medium for reading the files from the primary storage medium and a sorter for sorting files to be read into an order which reduces the movement of the reader relative to the primary storage medium, the sorter being arranged to defragment the fragmented files read from the primary storage medium to the sorter.

16. Apparatus according to claim 15, wherein said order lists the files according to their position relative to an end location of the primary storage medium.

17. Apparatus according to claim 15, wherein the apparatus is arranged to exclude from the reordered list files that have not changed since a previous back-up event.

18. Apparatus according to claim 15, wherein the primary storage medium is a data disk.

19. A data processing system including the apparatus of claim 15.

20. A storage area network including the apparatus of claim 15.

21. Apparatus for reading data from a primary storage medium, comprising a reader moveable relative to the primary storage medium for reading the files from the primary storage medium and a sorter for sorting files to be read into an order which reduces the movement of the reader relative to the primary storage medium the sorter being arranged to determine the position of a fragmented file in said order on the basis of the fragment representing the beginning of said fragmented file.

22. Apparatus for reading data from a primary storage medium, comprising a reader moveable relative to the primary storage medium for reading the files from the primary storage medium, a sorter for sorting files to be read into an order which reduces the movement of the reader relative to the primary storage medium, and a defragmenter for defragmenting files in the primary storage medium before sorting them into said order if the number of fragmented files exceeds a threshold.

23. Apparatus for reading data from a primary storage medium, comprising a reader moveable relative to the storage medium for reading the files from the primary storage medium, a sorter for sorting files to be read into an order that reduces the movement of the reader relative to the primary storage medium and a defragmenter for deframenting files in the primary storage medium before sorting them into said order if the number of fragmented files exceeds a threshold.

24. Apparatus for reading data from a primary storage medium, comprising a reader moveable relative to the primary storage medium for reading the files from the primary storage medium and a sorter for sorting files to be read into an order that reduces the movement of the reader relative to the primary storage medium, wherein the apparatus is arranged to exclude from the reordered list files that have not changed since a previous back-up event and for defragmenting fragmented files read from the primary storage medium to the sorter.

25. The apparatus of claim 24 wherein the apparatus is arranged to determine the position of a fragmented file in said order on the basis of the fragment representing the beginning of said fragmented file.

26. The apparatus of claim 24 wherein the apparatus is arranged to defragment files in the primary storage medium before sorting them into said order if the proportion of fragmented files exceeds a threshold.

27. Apparatus for reading data from a primary storage medium, comprising reading means moveable relative to the primary storage medium for reading the files from the primary storage medium and sorting means for sorting the files to be read into an order that reduces the movement of the reading means relative to the primary storage medium and for defragmenting fragmented files read from the primary storage medium to the sorter.

28. The apparatus of claim 27 wherein the sorting means is arranged to determine the position of a fragmented file in said order on the basis of the fragment representing the beginning of said fragmented file.

29. The apparatus of claim 27 wherein the sorting means is arranged to defragment files in the primary storage medium before sorting them into said order if the proportion of fragmented files exceeds a threshold.

30. Apparatus for backing up data from a primary storage medium, comprising a reader moveable relative to the primary storage medium for reading the files from the storage medium, a sorter for sorting files to be read into an order that reduces the movement of the reader relative to the primary storage medium and for defragmenting fragmented files read from the primary storage medium to the sorter, and a writer for writing the files into secondary back-up storage.

31. A data processing system including the apparatus of claim 30.

32. A storage area network including the apparatus of claim 30.

33. The apparatus of claim 30 wherein the sorter is arranged to defragment files in the primary storage medium before sorting them into said order if the proportion of fragmented files exceeds a threshold.

34. The apparatus of claim 30 wherein the sorter is arranged to determine the position of a fragmented file in said order on the basis of the fragment representing the beginning of said fragmented file.

35. Apparatus for backing up data from a primary storage medium, comprising a reader moveable relative to the storage medium for reading the files from the storage medium, a sorter for sorting files to be read into an order that reduces the movement of the reader relative to the primary storage medium and for defragmenting fragmented files read from the primary storage medium to the sorter, and a writer for writing the files into secondary back-up storage, wherein the apparatus is arranged to exclude from the reordered list files that have not changed since a previous back-up event.

36. The apparatus of claim 35 wherein the sorter is arranged to defragment files in the primary storage medium before sorting them into said order if the proportion of fragmented files exceeds a threshold.

37. The apparatus of claim 35 wherein the sorter is arranged to determine the position of a fragmented file in said order on the basis of the fragment representing the beginning of said fragmented file.

38. Apparatus for backing up data from a primary storage medium, comprising a reader moveable relative to the storage medium for reading the files from the storage medium, a sorter for sorting files to be read into an order that reduces the movement of the reader relative to the primary storage medium, a defragmenter for defragmenting files in the primary storage medium before sorting them into said order if the number of fragmented files exceeds a threshold and a writer for writing the files into secondary back-up storage.

39. Apparatus for backing up data from a primary storage medium, comprising reading means moveable relative to the storage medium for reading the files from the primary storage medium, sorting means for sorting files to be read into an order which reduces the movement of the reader relative to the primary storage medium and for defragmenting fragmented files read from the primary storage medium to the sorter, and writing means for writing the files into secondary, back-up, storage.

40. The apparatus of claim 39 wherein the sorting means is arranged to determine the position of a fragmented file in said order on the basis of the fragment representing the beginning of said fragmented file.

41. The apparatus of claim 39 wherein the sorting means is arranged to defragment files in the primary storage medium before sorting them into said order if the proportion of fragmented files exceeds a threshold.

42. A method of reading files stored on a memory disk, the files being stored on the disk in sectors at N different radii $R_1 \ldots R_k \ldots R_N$, comprising the steps of listing the order of the files on the disk to be read so that all the files in radius $R_i$ to be read are listed sequentially, followed immediately by all the files in a radius next to $R_i$, where $R_i$ is any of $R_1 \ldots R_k \ldots R_N$, rotating the memory and moving a reader of the tracks so that the files are sequentially read from the memory disk in accordance with the list, and defragmenting fragmented files after the fragmented files have been read from the tracks.

43. The method according to claim 42 wherein the defragmenting step includes reading the fragmented files from the disk memory and, upon encountering a fragmented file, reordering the list by reference to the fragment including the beginning of the fragmented file.

44. The method according to claim 42 further including defragmenting the fragmented files if the proportion of read fragmented files exceeds a predetermined value.

45. The method according to claim 44 wherein the fragmented files are defragmented on the disk memory prior to sorting them by the order of the physical location thereof as set forth in the list.

46. The method according to claim 42 further including determining the position of the fragmented file in said order on the list on the basis of the fragment representing the beginning of the file.

47. The method according to claim 42 wherein the defragmented files are defragmented before sorting them into said order if the proportion of fragmented files exceeds a threshold.

48. The method according to claim 42 further including writing the files, including the defragmented files, to a backup memory in the order the files are read from the disk memory.

49. Apparatus for reading data from a primary storage medium, comprising a reader moveable relative to the storage medium for reading the files from the primary storage medium, a sorter for sorting files to be read into an order that reduces the movement of the reader relative to the primary storage medium, and a defragmenter for deframenting files in the primary storage medium based on a determination of the position of a fragmented file in said order on the basis of the fragment representing the beginning of said fragmented file.

50. Apparatus for reading files stored on a memory disk, the files being stored on the disk in sectors at N different radii $R_1 \ldots R_k \ldots R_N$, comprising a sorter for listing the order of the files on the disk to be read so that all the files in radius $R_i$ to be read are listed sequentially, followed immediately by all the files in a radius next to $R_i$, where $R_i$ is any one of $R_1 \ldots R_k \ldots R_N$, a drive for rotating the memory and moving a reader of the tracks, a sorter for causing the files to be sequentially read by the reader from the memory disk in accordance with the list, the sorter being arranged for defragmenting fragmented files after the fragmented files have been read from the tracks.

51. The apparatus of claim 50 wherein the sorter is arranged to defragment files in the primary storage medium before sorting them into said order if the number of fragmented files exceeds a threshold.

52. The apparatus of claim 50 wherein the sorter is arranged to determine the position of a fragmented file in said order on the basis of the fragment representing the beginning of said fragmented file.

* * * * *